Dec. 13, 1960     C. C. BOOKOUT ET AL     2,963,866
CONSTANT SPEED ACCESSORY DRIVE
Filed Feb. 13, 1959                             6 Sheets-Sheet 1
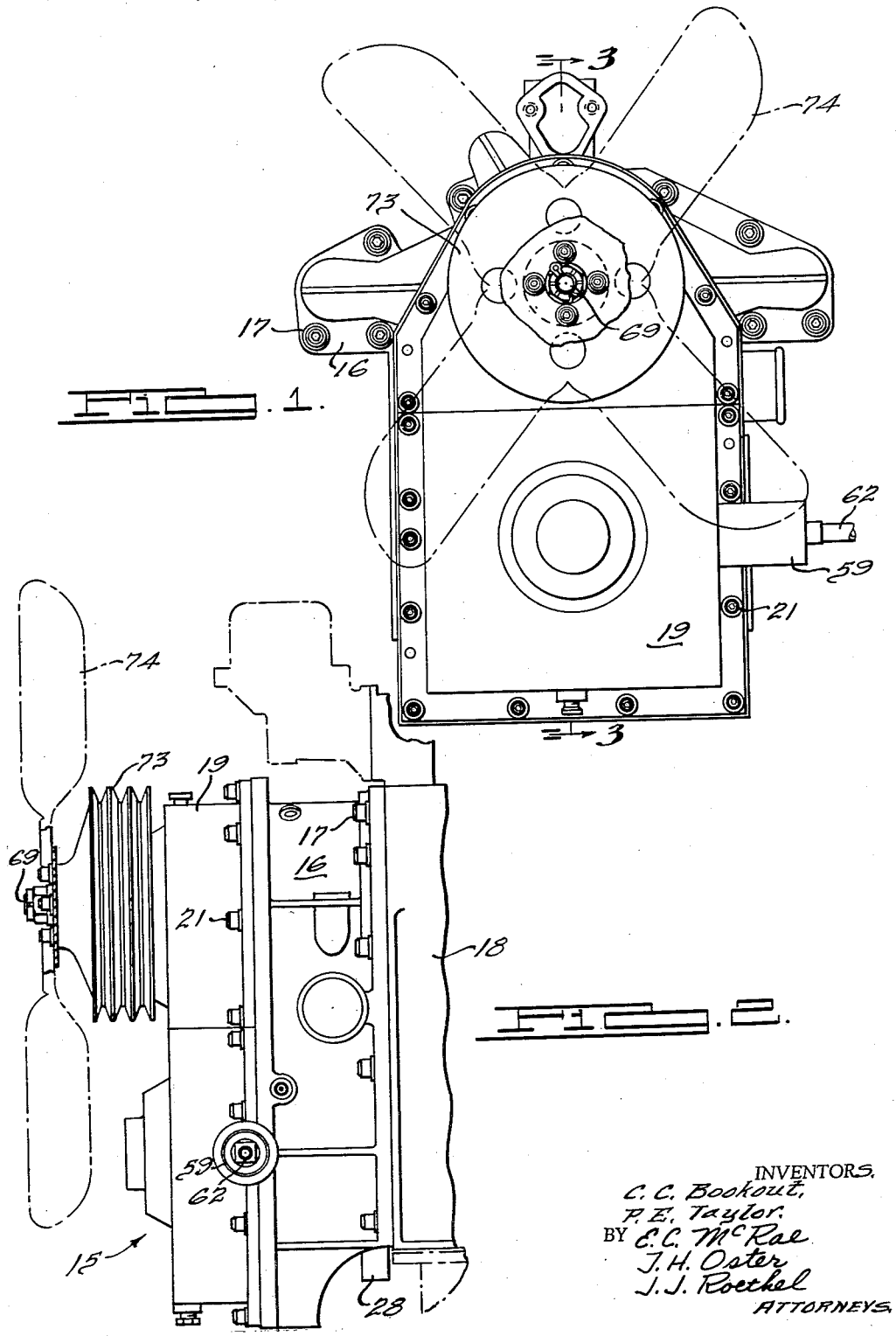
INVENTORS.
C. C. Bookout,
P. E. Taylor.
BY E. C. McRae
J. H. Oster
J. J. Roethel
ATTORNEYS.

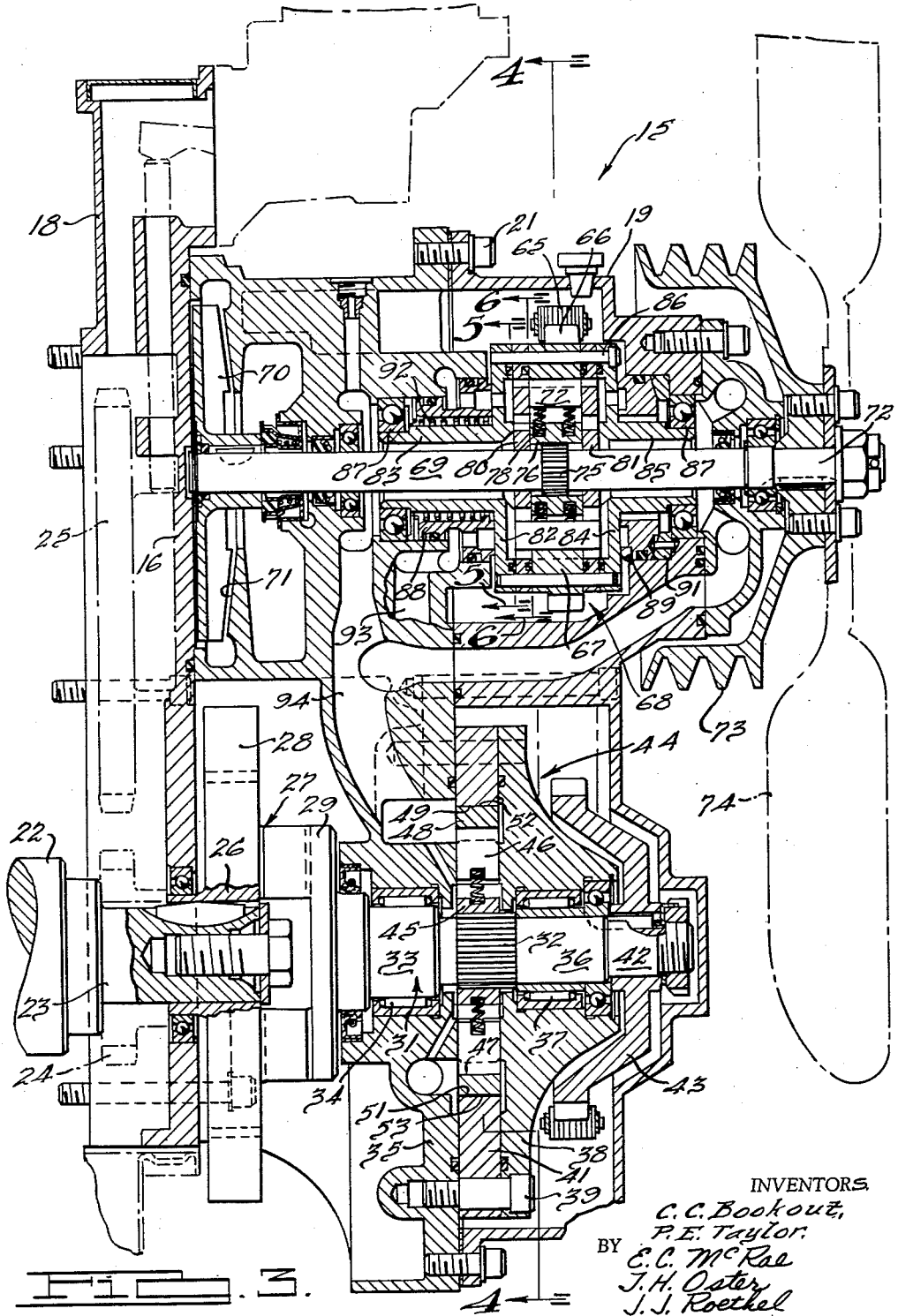

Dec. 13, 1960   C. C. BOOKOUT ET AL   2,963,866
CONSTANT SPEED ACCESSORY DRIVE
Filed Feb. 13, 1959   6 Sheets-Sheet 4
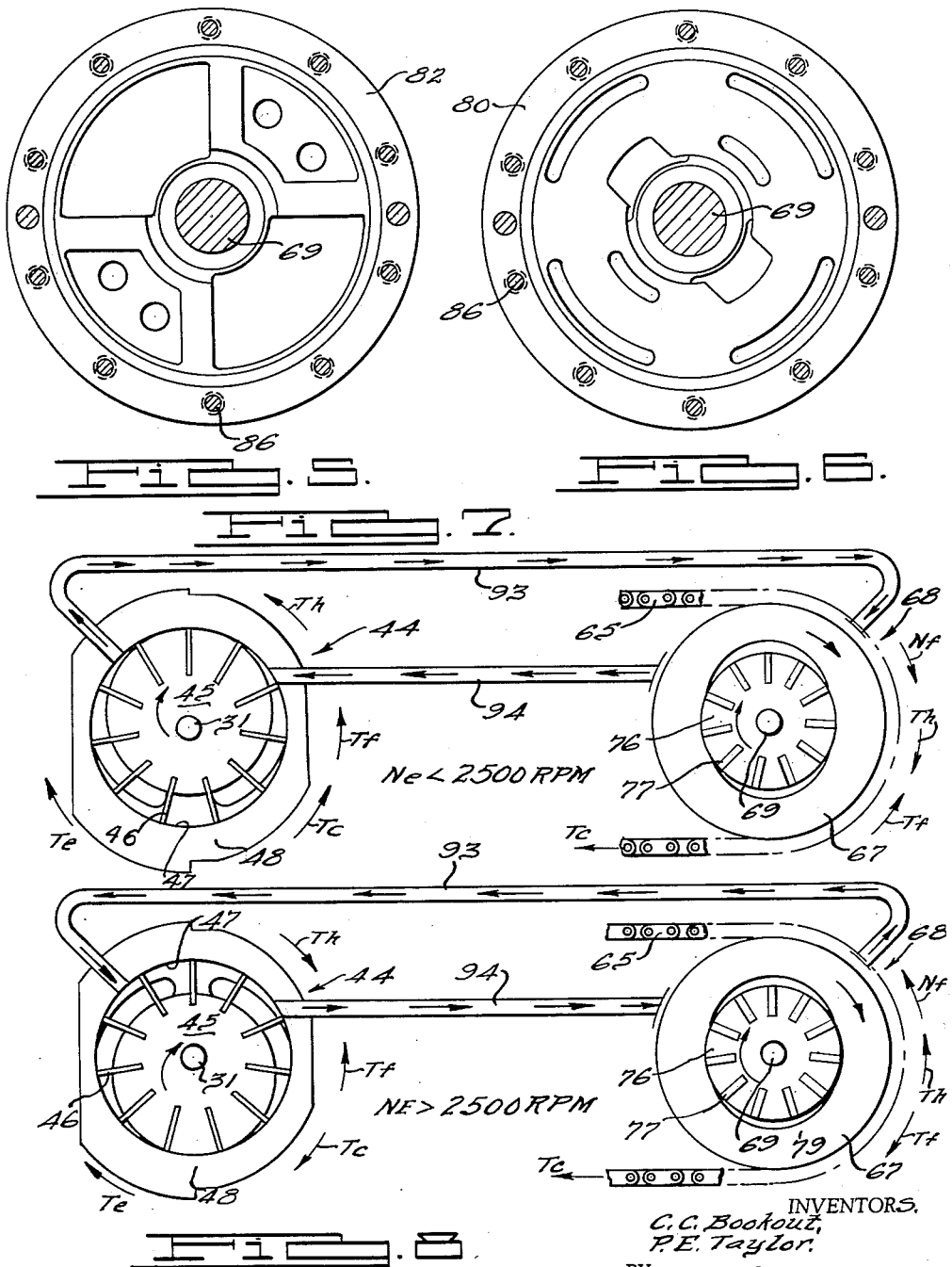

Dec. 13, 1960 C. C. BOOKOUT ET AL 2,963,866
CONSTANT SPEED ACCESSORY DRIVE
Filed Feb. 13, 1959 6 Sheets-Sheet 5

INVENTORS.
C. C. Bookout,
P. E. Taylor.
BY C. C. McRae
J. H. Oster
J. J. Roethel
ATTORNEYS.

United States Patent Office 2,963,866
Patented Dec. 13, 1960

2,963,866

CONSTANT SPEED ACCESSORY DRIVE

Charles C. Bookout and Paul E. Taylor, Livonia, Mich., assignors to Ford Motor Company, Dearborn, Mich., a corporation of Delaware Filed Feb. 13, 1959, Ser. No. 793,204

4 Claims. (Cl. 60—53)

The present invention relates to a drive mechanism for transmitting power from a vehicle engine crankshaft to engine driven accessories, the output shaft of the drive mechanism being maintained at a substantially constant speed regardless of variations in engine speed.

The modern automobile engine is designed to idle at about 400 r.p.m. and to attain a top speed of about 4500 r.p.m. It is conventional practice to drive certain of the accessories, such as the cooling fan, water pump, generator, power steering pump and, if the vehicle is air conditioned, the air conditioner compressor directly off the engine crankshaft through a multiple system of V-belt drives.

The design of such accessories to accommodate the wide range of engine operating speeds presents many difficulties. For example, the cooling fan is generally designed to satisfy the engine cooling requirements at idle speed and, therefore, provides excess cooling capacity at higher speeds. The results are a loss of engine horsepower at high speeds and the creation of excessive fan noise. The generator is also affected. It must be designed to provide a minimum current output at idle speed with the result that it generates excess current at high speeds. It also must be more expensively constructed to protect the armature windings against high speed centrifugal forces.

The maximum output requirementss for the water pump, the power steering pump and the air conditioner compressor also occur at relatively low engine speeds. Increasing the speed of these devices in direct proportion to the engine speed only consumes extra power with no increase in performance.

Additional power requirements of automotive accessories and their characteristic curves, which may show constant or increasing power requirements with increase in engine speed, indicate a need for a drive mechanism which will allow accessories to operate in their most efficient speed range. It is an object of the present invention to provide a constant speed accessory drive embodying a differential hydrostatic transmission consisting of an engine driven variable displacement pump coupled both mechanically and hydraulically to a fixed displacement hydraulic motor. The construction and arrangement is such that the output shaft of the transmission maintains a substantially constant speed independently of engine speed. Accessories driven in this manner may be designed to attain their optimum speed at any predetermined engine speed and to operate more efficiently through the entire engine operating range.

Other objects, advantages and features of the present invention will be made more apparent as the description proceeds, particularly when considered in connection with the accompanying drawings, wherein:

Fig. 1 is a front elevational view of the hydrostatic transmission housing affixed to the front of the engine block;

Fig. 2 is a side elevational view of Fig. 1;

Fig. 3 is a vertical sectional view taken substantially through line 3—3 of Fig. 1 looking in the direction of the arrows;

Fig. 5 is a sectional view taken substantially through line 5—5 of Fig. 3 looking in the direction of the arrows;

Fig. 6 is a sectional view taken substantially through line 6—6 of Fig. 3 looking in the direction of the arrows;

Fig. 7 is a diagrammatic representation of the function of the variable displacement unit and fixed displacement unit when the engine speed is less than a predetermined r.p.m.;

Fig. 8 is a diagrammatic representation of the function of the variable displacement unit and fixed displacement unit when the engine speed is greater than a predetermined engine r.p.m.;

Figure 4:
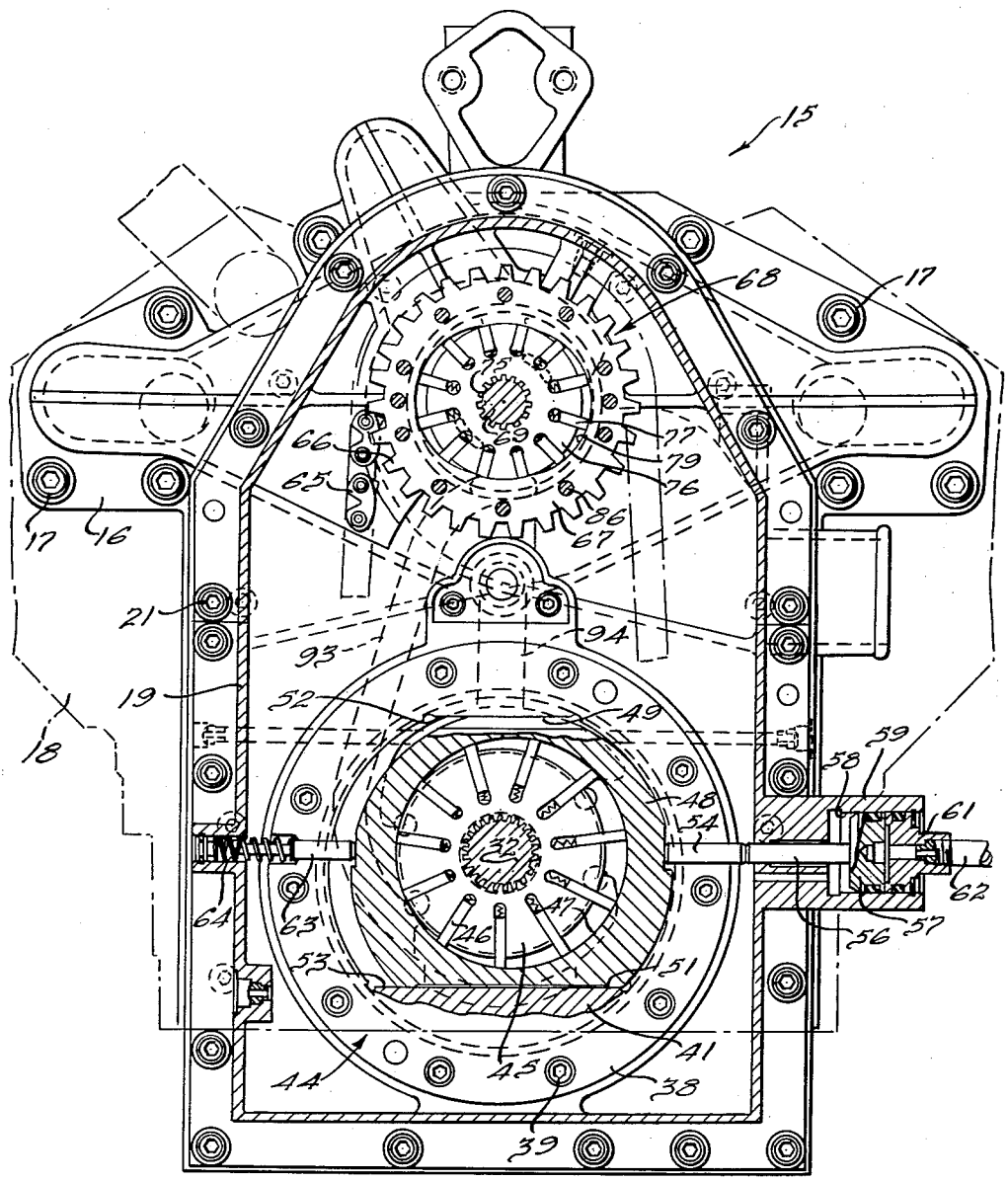
Fig. 4 is a sectional view taken substantially through line 4—4 of Fig. 3 looking in the direction of the arrows.

Referring now to the drawings and particularly to Figs. 1 to 7, inclusive, the principles of the present invention are shown applied to an exemplary structure. The accessory drive unit, generally designated 15, is enclosed in a casing or housing 16 adapted to be mounted, as by bolts 17, to the front face of the engine block 18. The casing or housing 16 supports a secondary casing or housing 19 on its front face, the latter being held in place by bolts 21.

As best seen in Fig. 3, the crankshaft 22 of the engine is provided with an extension 23 which projects into the housing 16. Shown in dot and dash outline immediately to the right of the front face of the engine block is the timing gear pinion 24 and the timing gear 25. These play no part in the operation of the present device but provision must be made to accommodate them in the housing 16. Keyed to the outboard end of the crankshaft 22 is the drive element 26 of a flexible coupling 27. The drive element 26 may also be used as the inner element of a resiliently mounted annulus or other conventional crankshaft vibration damper element 28.

The driven element 29 of the flexible coupling 27 is provided with a stepped shaft 31 provided with a splined intermediate section 32. As best seen in Fig. 3, the stepped shaft 31 is rotatably journalled at its inner end 33 on a roller bearing device 34 carried in a bore in the wall section 35 of the casing 16. Outboard of the splined section 32 the shoulder section 36 of the shaft 31 is journalled in a roller bearing 37 carried in a removable head 38. The head 38 is bolted, as by bolts 39, to the face of the casing wall 35 although spaced from the wall by an annulus 41. The annulus 41 actually forms the cylinder housing the variable displacement pump, as will be explained. Suitable oil seals are provided where required and is not believed necessary to go into detail on this conventional practice.

The extreme outboard end 42 of the shaft 31 projects through the head 38. A sprocket 43 is keyed to this end of the shaft, for a purpose to be explained.

The wall section 35 of the casing or housing 16, the annulus 41 and the head 38 form the casing for a variable displacement guided vane type pump, generally designated 44. The rotor 45 of the pump is splined to the splined section 32 of the shaft 31. The pump vanes 46 are spring urged outwardly to ensure contact at low pumping speeds with the bore 47 of a non-rotatable ring 48. The ring 48 is constructed and arranged for lateral movement relative to the center of rotation of the rotor 45.

It will be noted that the upper and lower outer edges 49 and 51 of the ring are flat and slidable on flat surfaces 52 and 53, respectively, of the annulus 41. Movement of the ring 48 to the left of its Fig. 4 position results in decreased eccentricity of its bore 47 relative to the rotor 45 and therefore decreased pumping action. The position of the ring 48 is controlled by a plunger or push rod 54 slidably journalled in a radially extending bore in the annulus 41. The push rod 54 is adapted to be shifted radially inwardly by the piston rod 56 of a piston 57 suitably housed in a cylindrical bore 58 of a boss 59 on the side wall of housing 19. The piston 57 is adapted to be actuated by fluid pressure, the fluid being admitted to the cylindrical bore 58 through an aperture in a plug 61 to which a fluid conduit 62 is coupled. The source of the fluid supplied through conduit 62 will be explained in describing the operation of the accessory drive device.

Diametrically opposed to the push rod 54 is a second push rod 63 also slidably journalled in the wall of the annulus 41. This push rod 63 is under the influence of a spring 64 which opposes the action of the piston 57 in pushing the ring 48 to the left and which is effective to restore the ring to its Fig. 4 position upon the fluid pressure acting against the piston 57 falling below a predetermined pressure.

The sprocket 43 is operatively coupled by a chain 65 to sprocket teeth 66 formed on the periphery of the rotatable ring 67 of a fixed displacement guided vane hydraulic motor, herein generally designated 68.

Before explaining the motor 68 in detail, reference will be made first to a shaft 69 which is rotatably journalled in the upper portion of the housing 16 and 19. It will be noted that this shaft 69 is located vertically above and parallel to the shaft 31. At its left end, as viewed in Fig. 3, the shaft 69 has coupled thereto a conventional water pump impeller 70. The housing 18 is provided with a suitable chamber 71 in which the impeller 70 rotates and with supply and discharge cavities, conduits or the like so that the water pump may function to supply coolant to the engine in a conventional manner. At its outboard end 72 the shaft has a multiple belt sheave 73 keyed thereto. A conventional automotive engine cooling fan 74 is bolted to the front face of the sheave 73.

The shaft 69 is provided with a splined section 75 which receives the rotor 76 of the motor 68. The rotor 76 is slotted to receive the guide vanes 77 in a conventional manner, the vanes being spring loaded outwardly by springs 78. The rotor 76 operates within the eccentric bore 79 of the ring 67.

The ring 67 and rotor 76 are arranged between a pair of cheek plates 80 and 81. The cheek plate 80 is in juxtaposition to the flange 82 of a cylindrical member 83. The cheek plate 81 is similar in juxtaposition to the flange 84 of a cylindrical member 85. The ring 67, cheek plates 80 and 81 and cylindrical members 83 and 85, through their respective flanges 82 and 84, are rigidly clamped together by a plurality of bolts 86. The foregoing assembly is journalled for rotation concentrically with the shaft 69 on suitable bearings 87 supporting the outboard ends of each of the cylindrical members 83 and 85.

The outer surface of each flange 82 and 84 is engaged by pressure plates 88 and 89, respectively. The pressure plate 89 is an annulus positioned in the counterbore in the casing 19, its axial position being established by a spacer ring 91. The pressure plate 88 engaged with the flange 82 is urged tightly thereagainst by a compression spring 92. The cheek plates 80 and 81, flanges 82 and 84, and pressure plates 88 and 89 are provided with the necessary inlet, outlet and transfer ports and chambers.

The configuration of these various openings in the flanges 82 and 84 are shown in Fig. 5 and those in the cheek plates are shown in Fig. 6.

Briefly restated, the present invention comprises an accessory drive unit 15 which is a differential type hydrostatic transmission consisting of the engine driven variable displacement pump 44 coupled both mechanically and hydraulically to the fixed displacement hydraulic motor 68. The coupling 27, as mentioned, drives the ring 67 of the fixed displacement motor at a predetermined ratio to engine speed through the chain 65, the latter extending between the sprocket 43 mounted on the shaft 31 of the coupling driven element 29 and the sprocket teeth 66 on the periphery of the ring 67. As has been described, the rotor 76 of the fixed displacement motor is connected to the accessory load through the shaft 69. The rotor 76 is driven hydraulically by the variable displacement pump 44 to drive the accessories at the desired speed.

The foregoing relationship is schematically illustrated in Figs. 7 and 8. Fig. 7 represents the flow of hydraulic fluid through the hydraulic circuit connecting the variable displacement pump 44 and the fixed displacement motor 68 when engine speed is less than a predetermined r.p.m. and Fig. 8 when engine speed exceeds the predetermined r.p.m. For purposes of explanation, this predetermined r.p.m. is 2500 and the desired accessory drive output shaft r.p.m. is set at 3000. Also, the units as illustrated were so designaed that at engine speeds up to 1250 r.p.m., the variable displacement unit keeps the accessories running at 2.4 times the engine speed. This relationship is seen in the chart shown in Fig. 10. Thus, an engine speed of 1250 r.p.m. results in an accessory shaft 69 speed of 3000 r.p.m. (see Fig. 11).

When the engine speed exceeds 1250 r.p.m., the stroke of the variable displacement unit is reduced by a hydraulic servo-control to maintain the accessory speed at 3000 r.p.m. With reference to Fig. 4, this means that fluid under pressure (in a manner to be more fully explained) is admitted through conduit 62 and acts against piston 57 to move it to the left. Movement of the piston to the left is transmitted through the push rod 54 to the ring 48. The ring 48 is shifted to the left reducing the eccentricity of its bore 47 relative to the axis of the rotor 45 and correspondingly reducing the high pressure output of the pump through the high pressure conduit 93 (see Figs. 4 and 7), conduit 94 being the low pressure or return conduit. In other words, as the stroke of the pump 44 is reduced, the flow of the pump to the rotor 76 of the fixed displacement motor is reduced, and with this reduction in flow the relative rotation of the ring 67 and rotor 76 is reduced maintaining a constant accessory speed.

Figure 12:
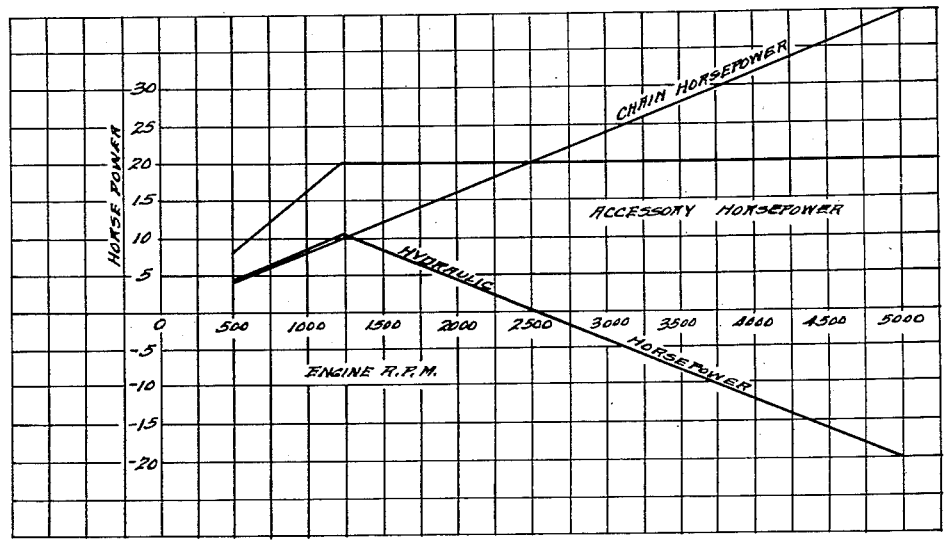
Fig. 12 is a graph illustrating the relationship between mechanical horsepower, hydraulic horsepower and accessory horsepower.

When the engine reaches 2500 r.p.m., the stroke of the variable pump 44 becomes zero and there is no flow from the pump. This means that the rotor 76 of the fixed displacement unit 68 no longer has any relative motion to the ring 67 and all the power to the accessories is being transmitted by the chain drive. It should be noted here that the ratio of the drive sprocket 43 to the driven sprocket or ring 67 is, in the illustrated structure, 1.185:1. Thus, engine speed of 2500 r.p.m. gives substantially shaft 69 speed of 3000 r.p.m. This region of operation then is the most efficient because there is no hydraulic power transmitted and the more efficient mechanical couple is supplying all the power (see Fig. 12).

At engine speeds above 2500 r.p.m., the hydraulic servo-controller strokes the variable unit beyond center. This has the effect of reversing the flow of fluid through the conduits 93 and 94. The fixed displacement device 68 is thus caused to function as a hydraulic brake, that is, the direction of relative rotation of the rotor 76 to the ring 67 is reversed. The further the speed of the engine is increased above 2500 r.p.m., the further the variable unit is stroked to the left of center (see Fig. 4), thereby increasing the relative reverse rotation between the rotor 76 and the ring 67 and resulting in increased braking action. Whereas the mechanical coupling between the pump shaft 31 and the ring 67 would tend to drive the accessory drive shaft 69 at a speed equal to the speed of the engine drive shaft, assuming that the rotor 76 and ring 67 were hydraulically locked to each other, the reverse rotation of the rotor 76 relative to the ring 67 slows down the accessory drive shaft to the predetermined desired constant speed. As seen from Fig. 12, the accessory drive shaft remains substantially at 3000 r.p.m.

Briefly returning to Figs. 7 and 8, it will be noted that directional arrows marked with identifying symbols appear in both views. The arrows indicate torque components as follows: T$f$—friction torque; T$e$—engine torque; T$c$—chain torque and T$h$—hydraulic torque. The arrow N$f$ indicates the direction of rotation of the rotor 76 relative to the ring 67. The symbol N$e$ indicates engine r.p.m.

Figure 10:
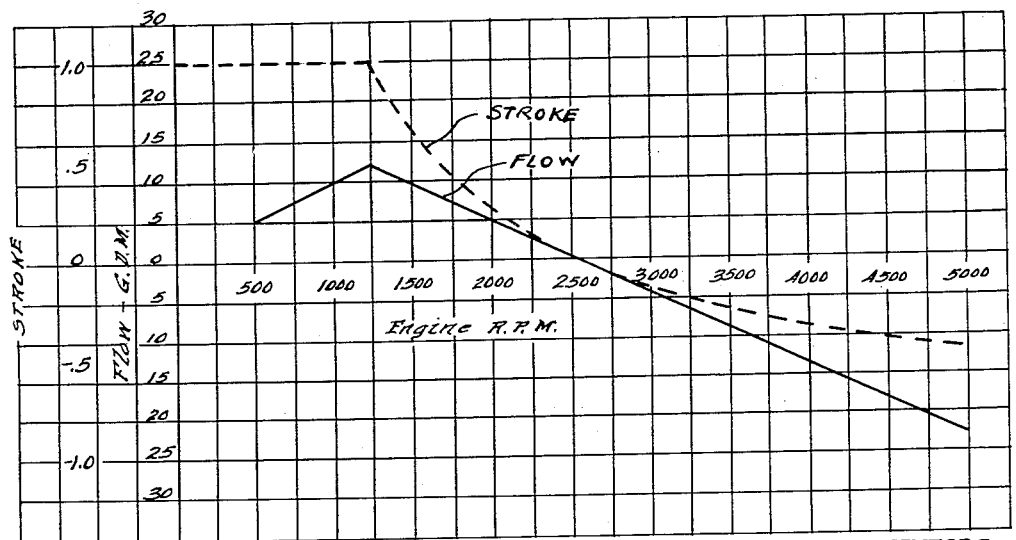
Fig. 10 is a graph illustrating the flow controlled by the variable displacement unit in relation to engine r.p.m.
Figure 11:
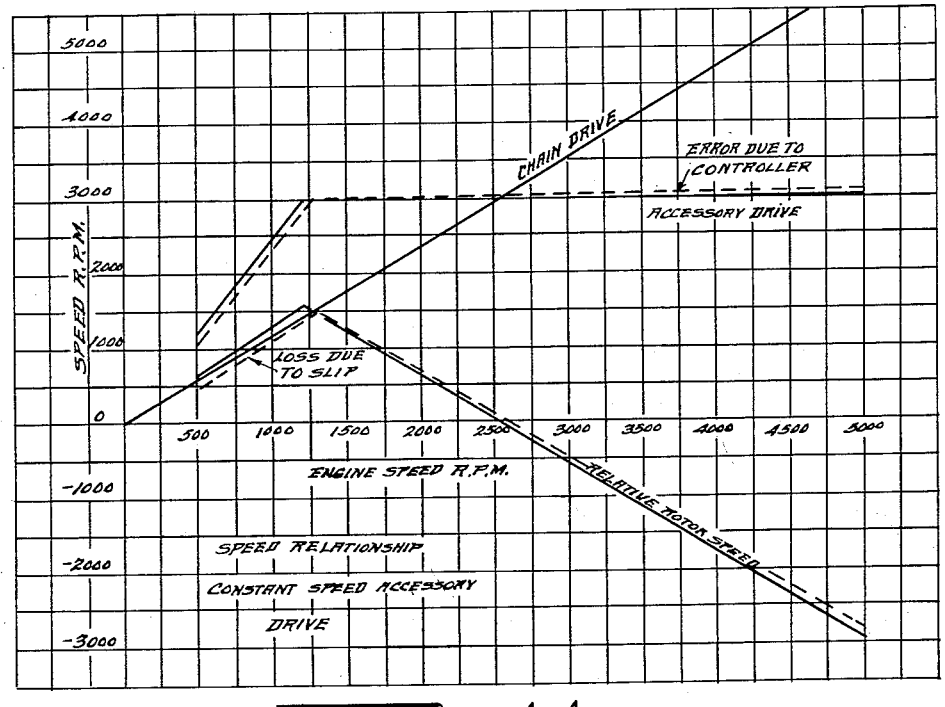
Fig. 11 is a graph illustrating the speed relationship of the constant speed accessory drive output shaft to the engine speed.

As seen from Fig. 10, at engine speeds in the range of 3000 r.p.m., which is the engine r.p.m. at a car speed of 70 m.p.h in one model vehicle currently on the road, little hydraulic fluid is being pumped, the flow being read from the chart as about 3 gallons per minute. Therefore, heating problems are minimized. As is known, a straight hydraulic transmission or slip clutch generates considerable heat and requires extensive heat dissipation facilities. The elimination of these heat dissipation facilities is one of the advantages of the present invention.

Figure 9:
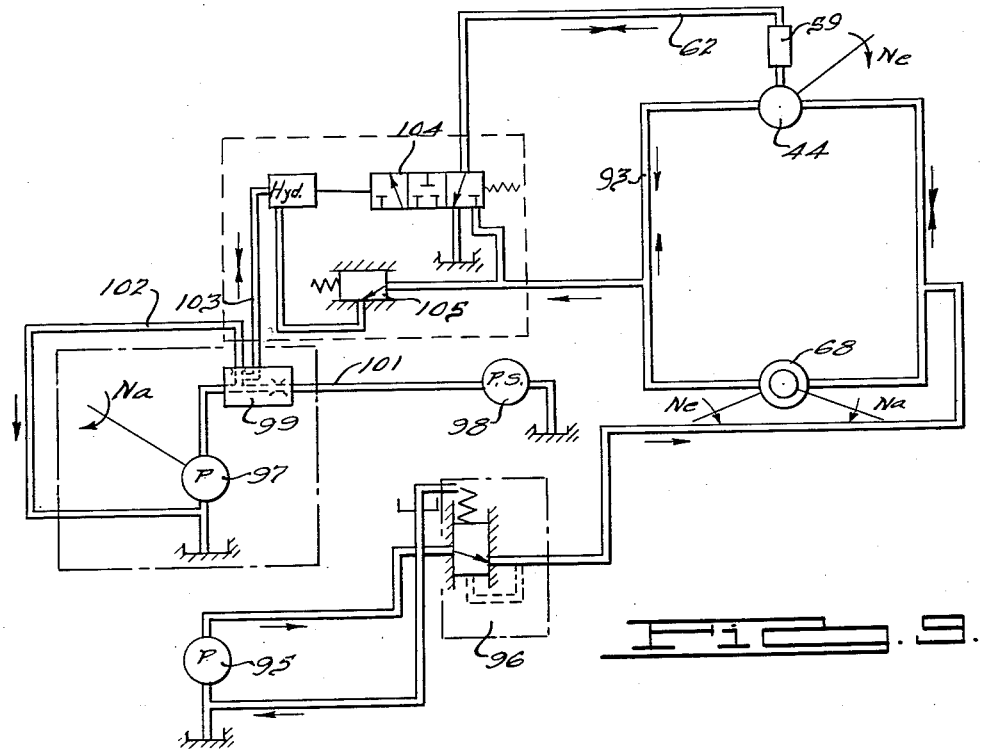
Fig. 9 is a schematic hydraulic circuit embodying the constant speed accessory drive of the present invention.

Brief mention was made above of the servo-control system which controls the variations in the pumping stroke of the variable displacement pump 44. This control system may best be explained with reference to Fig. 9 which is a schematic diagram of an exemplary hydraulic circuit which may be used with the constant speed accessory drive embodying the present invention.

The hydraulic circuit is a closed circuit which is supercharged to a predetermined initial pressure. The supercharging fluid is obtained by tapping a line from the discharge side of the front pump 95 of the vehicle automatic transmission. Most vehicles equipped with power accessories are also equipped with automatic transmissions, making the front pump a convenient place to obtain the supercharging fluid. If necessary, a separate supercharging pump could be provided. The discharge pressure of a front transmission pump may vary from 50 p.s.i. to 150 p.s.i. Between the pump 95 and the closed control circuit, there is provided a replenishing valve 96. The valve 96 may be set to open whenever the pressure in the control circuit falls below 50 to 60 p.s.i. thereby permitting the circuit to be again supercharged to the desired initial pressure. Once the system or circuit is supercharged to the pressure between 50 and 60 p.s.i., very little demand is made on the pump 95. The latter is called upon only to replenish fluid loss through incidental leakage and to restore the initial pressure lost through such leakage.

In effect, the control circuit is an error sensing system. Any deviation of the accessory drive shaft 69 from its predetermined normal speed throws an error factor into the system. In the present embodiment the occurrence of the error or deviation from normal r.p.m. of the accessory shaft is sensed by a continual evaluation of the output of the power steering pump designated 97 in the circuit diagram. The power steering unit 98 adapted to be operated by the pump 97 is of the open center valve type and, therefore, receives a constant volume of hydraulic fluid whether or not it is being called upon to exert steering force. The power steering pump 97 is belt driven directly from the sheave 73 coupled to the driven shaft 69. The output of the power steering pump 97 passes through a flow control valve 99 before reaching the steering gear unit 98. It will be noted that the flow control valve 99 has three outlets. The primary outlet 101 is provided with a restriction or flow control element effective to provide a predetermined amount of fluid to the steering gear unit. The valve is also provided with a secondary outlet 102 suitably restricted to control the fluid flow back to the intake side of the power steering pump. The third outlet 103 of the valve is not restricted but is connected to a valve 104 which may be called the hydraulically actuated error sensing valve. The sensing valve 104 is connected by conduit 62 to the pump stroking servo-mechanism, the latter having been described as the push rod 54 actuated by the piston 57 (see Fig. 4).

In operation, when the accessory drive shaft 69 is rotating at 3000 r.p.m., the output of the power steering pump is such that the back pressure caused by the restricted flow through the outlets 101 and 102 results in a pressure in the outlet 103 which acts as a signal to the error sensing valve 104 causing the latter to put conduit 93 in communication with conduit 62 of the servo-mechanism. The pressure in the conduit 62 then becomes of sufficient value to cause the ring 48 to be shifted to the left (see Fig. 4) to a non-eccentric position relative to the rotor 45. The output of the variable displacement pump 44 becomes zero and the couple between the engine and the accessories becomes a mechanical one, as has been explained.

Should the speed of the shaft 69 drop below 3000 r.p.m., the pressure in the outlet 103 will drop causing the error sensing valve to put conduit 62 in communication with the reservoir. The spring 64 will then be able to shift the ring 48 to the right as viewed in Fig. 4 until the eccentricity causes the pump 44 to start pumping high pressure fluid to the fixed displacement motor 68. Then, as has been explained, the couple between the engine and accessory drive shaft 69 becomes part mechanical and part hydraulic with the resultant output speed of the shaft 69 being restored to 3000 r.p.m. at engine speeds above 1250 r.p.m. At engine speeds below 1250 r.p.m., the speed of the shaft 69 is 2.4 times the engine speed.

Should the accessory shaft 69 tend to rotate faster than 3000 r.p.m., the pressure in outlet 103 increases and effects the pressure in conduit 62 as above described. The result is that the ring 48 is shifted to the left of the neutral position and, as has been explained, the fixed displacement unit 68 functions as a hydraulic brake. The relative rotation between the engine shaft and accessory drive shaft becomes such that the drive shaft 69 runs slower than the engine shaft and maintains its desired speed of 3000 r.p.m.

The circuit is provided with a system relief valve 105 to take care of any pressure buildups in the system which might exceed a predetermined value. When the system pressure exceeds the predetermined high limit, valve 105 permits a sufficient amount of fluid under pressure to be transmitted from conduit 93 to the error sensing valve 104 thereby throwing an error into the system. This admits oil under pressure to conduit 62 which results in ring 48 being returned to full stroke position as a motor. This pressure control arrangement prevents overspeeding of the accessories under any conditions.

It will be understood that there will be variations in the speed of the accessory drive shaft 69 from the predetermined operating speed. The system, however, will continually fluctuate as it attempts to maintain the speed of the accessory drive shaft. Upon acceleration or deceleration of the engine, the hydraulic unit may lag slightly in compensating for the change in speed of the mechanical couple. But it will be readily apparent that the variations in speed of the accessory drive shaft will be only a small percentage of the variation in speed of the engine shaft. It is believed that the utilization of the principles of the present invention will enable most accessories to be redesigned so as to permit reduction in size, overload capacity and the like. Such redesign should permit substantial cost savings to be achieved.

It will be understood that the invention is not to be limited to the exact construction shown and described, but that various changes and modifications may be made without departing from the spirit and scope of the invention, as defined in the appended claims.

What is claimed is:

1. In combination, a variable speed engine driven shaft; an accessory drive shaft; a hydrostatic transmission means interposed between said shafts; and a servo-mechanism automatically adjusting the operation of said transmission to maintain said accessory drive shaft at a predetermined substantially constant speed throughout a predetermined range of speeds of said engine driven shaft; said transmission comprising a pump and a hydraulic motor, said pump having a casing, a nonrotatable ring supported for lateral movement within said casing, a rotor positioned within said ring, vanes operatively mounted in said rotor and cooperating with said ring to provide an expansible fluid chamber, and means coupling said rotor to said engine driven shaft, said motor having a rotatable casing, means journalling said rotatable casing on said accessory drive shaft, a rotor positioned in said rotatable casing and coupled to said accessory drive shaft, and vanes operably mounted in said motor rotor and cooperating with said rotatable casing to provide an expansible fluid chamber; conduit means connecting the respective high and low pressure sides of said pump and motor to each other; and mechanical means coupling said motor casing to said engine driven shaft for rotation thereby; said servo-mechanism comprising an accessory pump coupled to said accessory drive shaft and having a predetermined output pressure at said predetermined constant speed of said accessory drive shaft, pressure responsive means acted upon by said output pressure and including an element engaged with said pump ring to shift the latter laterally relative to the pump rotor to vary the output of said transmission pump, the speed of said motor rotor being increased or decreased relative to the speed of rotation of the motor casing thereby increasing or decreasing the speed of said accessory drive shaft relative to the speed of the engine driving shaft as the latter varies to restore the former to its predetermined substantially constant speed.

2. In combination, a variable speed engine driven shaft; an accessory drive shaft; a hydrostatic transmission means interposed between said shafts; and a servo-mechanism automatically adjusting the operation of said transmission to maintain said accessory drive shaft at a predetermined substantially constant speed throughout a predetermined range of speeds of said engine driven shaft; said transmission comprising a pump and a hydraulic motor, said pump having a casing, a nonrotatable ring supported for lateral movement within said casing, a rotor positioned within said ring, vanes operatively mounted in said rotor and cooperating with said ring to provide an expansible fluid chamber, and means coupling said rotor to said engine driven shaft, said motor having a rotatable casing, means journalling said rotatable casing on said accessory drive shaft, a rotor positioned in said rotatable casing and coupled to said accessory drive shaft, and vanes operably mounted in said motor rotor and cooperating with said rotatable casing to provide an expansible fluid chamber; conduit means connecting the respective high and low pressure sides of said pump and motor to each other; and mechanical means coupling said motor casing to said engine driven shaft for rotation thereby; said servo-mechanism comprising an accessory pump coupled to said accessory drive shaft and having a predetermined output pressure at said predetermined constant speed of said accessory drive shaft, fluid pressure responsive means including an element shiftable in one direction by fluid under pressure from said accessory pump means transmitting movement of said shiftable element to said laterally shiftable pump ring, biasing means acting on said pump ring in opposition to said fluid pressure responsive means, said biasing means normally balancing the output pressure of said accessory pump acting on said fluid pressure responsive means when said accessory drive shaft is operating at said predetermined constant pressure, said servo-mechanism being responsive to cause said pump ring to be laterally shifted in a direction compensating for changes in output pressure of said accessory pump, the output of said transmission pump being increased or decreased as the output pressure of said accessory pump is respectively decreased or increased, the speed of said motor rotor being increased or decreased in relation to said transmission pump output whereby the speed of said accessory drive shaft is restored to its predetermined constant speed and the output pressure of the accessory pump is stabilized.

3. In combination, a variable speed engine driven shaft; an accessory drive shaft; a hydrostatic transmission means interposed between said shafts; and a servo-mechanism automatically adjusting the operation of said transmission to maintain said accessory drive shaft at a predetermined substantially constant speed throughout a predetermined range of speeds of said engine driven shaft; said transmission comprising a pump and a hydraulic motor, said pump having a casing, a nonrotatable ring supported for lateral movement within said casing, a rotor positioned within said ring, vanes operatively mounted in said rotor and cooperating with said ring to provide an expansible fluid chamber, and means coupling said rotor to said engine driven shaft, said motor having a rotatable casing, means journalling said rotatable casing on said accessory drive shaft, a rotor positioned in said rotatable casing and coupled to said accessory drive shaft, and vanes operably mounted in said motor rotor and cooperating with said rotatable casing to provide an expansible fluid chamber; conduit means connecting the respective high and low pressure sides of said pump and motor to each other; and mechanical means coupling said motor casing to said engine driven shaft for rotation thereby; said servo-mechanism comprising an accessory pump coupled to said accessory drive shaft and having a predetermined output pressure at said predetermined constant speed of said accessory drive shaft, fluid pressure responsive means including an element shiftable in one direction by fluid under pressure from said accessory pump, means transmitting movement of said shiftable element to said laterally shiftable pump ring, biasing means acting on said pump ring in opposition to said fluid pressure responsive means, said biasing means normally balancing the output pressure of said accessory pump acting on said fluid pressure responsive means when said accessory drive shaft is operating at said predetermined constant pressure, said servo-mechanism being responsive to cause said pump ring to be laterally shift in a direction compensating for changes in output pressure of said accessory pump, the output of said transmission pump being increased or decreased as the output pressure of said accessory pump is respectively decreased or increased, and speed of said motor rotor being increased or decreased in relation to said transmission pump output whereby the speed of said accessory drive shaft is restored to its predetermined constant speed and the output pressure of the accessory pump is stabilized, the output of said transmission pump being substantially zero at the stabilized output pressure of said accessory pump whereby said motor rotor is hydraulically locked to said motor casing and power from said engine drive shaft to said accessory drive shaft is transmitted through said mechanical means.

4. In combination, a variable speed engine driven shaft; an accessory drive shaft; a hydrostatic transmission means interposed between said shafts; and a servo-mechanism automatically adjusting the operation of said transmission to maintain said accessory drive shaft at a predetermined substantially constant speed throughout a predetermined range of speeds of said engine driven shaft; said transmission comprising a pump and a hydraulic motor, said pump having a casing, a nonrotatable ring supported for lateral movement within said casing, a rotor positioned within said ring, vanes operatively mounted in said rotor and cooperating with said ring to provide an expansible fluid chamber, and means coupling said rotor to said engine driven shaft, said motor having a rotatable casing, means journalling said rotatable casing on said accessory drive shaft, a rotor positioned in said rotatable casing and coupled to said accessory drive shaft, and vanes operably mounted in said motor rotor and cooperating with said rotatable casing to provide an expansible fluid chamber; conduit means connecting the respective high and low pressure sides of said pump and motor to each other; and mechanical means coupling said motor casing to said engine driven shaft for rotation thereby; said servo-mechanism comprising an accessory pump coupled to said accessory drive shaft and having a predetermined output pressure at said predetermined constant speed of said accessory drive shaft, pressure responsive means acted upon by said output pressure and including an element engaged with said pump ring to shift the latter laterally relative to the pump rotor to vary the output of said transmission pump, the speed of said motor rotor being increased or decreased relative to the speed of rotation of the motor casing thereby increasing or decreasing the speed of said accessory drive shaft relative to the speed of the engine driving shaft as the latter varies to rstore the former to its predetermined substantially constant speed, the output of said transmission pump being substantially zero at the stabilized pressure of said accessory pump whereby said motor rotor is hydraulically locked to said motor casing and power from said engine drive shaft to said accessory drive shaft is transmitted through said mechanical means.

References Cited in the file of this patent
UNITED STATES PATENTS

| | | |
|---|---|---|
| 1,695,289 | Lee | Dec. 18, 1928 |
| 2,186,556 | Robbins | Jan. 9, 1940 |
| 2,803,112 | Sadler et al. | Aug. 20, 1957 |